:## (12) United States Patent
Baum et al.

(10) Patent No.: US 10,562,358 B2
(45) Date of Patent: Feb. 18, 2020

(54) DEVICE FOR TIRE PRESSURE MONITORING OF A VEHICLE SYSTEM

(71) Applicant: Deere & Company, Moline, IL (US)

(72) Inventors: Bernd Baum, Dannstadt-Schauernheim (DE); Florian Schott, Bensheim (DE); Florian Reinmuth, Sinsheim (DE)

(73) Assignee: DEERE & COMPANY, Moline, IL (US)

( * ) Notice: Subject to any disclaimer, the term of this patent is extended or adjusted under 35 U.S.C. 154(b) by 226 days.

(21) Appl. No.: 15/443,017

(22) Filed: Feb. 27, 2017

(65) Prior Publication Data
US 2017/0253093 A1 Sep. 7, 2017

(30) Foreign Application Priority Data
Mar. 7, 2016 (DE) ........................ 10 2016 203 689

(51) Int. Cl.
*B60C 23/00* (2006.01)
*B60C 23/04* (2006.01)
(52) U.S. Cl.
CPC ........ *B60C 23/0479* (2013.01); *B60C 23/002* (2013.01); *B60C 23/003* (2013.01)
(58) Field of Classification Search
CPC .............. B60C 2200/08; B60C 23/002; B60C 23/0479; B60C 23/0408; B60C 23/0474; B60C 23/003
USPC ........................... 702/98, 138, 183; 701/34.4
See application file for complete search history.

(56) References Cited

U.S. PATENT DOCUMENTS

| 6,218,935 B1 | 4/2001 | Corcoran et al. |
| 7,302,837 B2 | 12/2007 | Wendte |
| 2002/0003571 A1* | 1/2002 | Schofield ............... B60C 23/00 348/148 |

(Continued)

FOREIGN PATENT DOCUMENTS

| DE | 202011051292 U1 | 2/2012 |
| DE | 102011085040 A1 | 4/2013 |

(Continued)

OTHER PUBLICATIONS

German Search Report in foreign counterpart application No. 102016203689.0 dated Oct. 7, 2016 (8 pages).

(Continued)

*Primary Examiner* — John E Breene
*Assistant Examiner* — Jeffrey P Aiello

(57) ABSTRACT

A device for tire pressure monitoring of a vehicle tire of a vehicle system includes a tire inflation system in communication with the vehicle tire. A control unit calculates a set pressure value to be maintained for the tire pressure. A storage unit is in communication with the control unit such that the control unit adjusts the calculated set pressure value in dependence on an operating state classification derived from operating state parameters of the vehicle system. The control unit determines a geoposition of the vehicle system correlating with the derived operating state classification and stores it with the operating state classification in the storage unit. The control unit further recalls from the storage unit the relevant operating state classification for purposes of anticipatory adjustment of the set pressure value of the tire pressure when a renewed approach of the vehicle system to the stored geoposition is detected.

14 Claims, 1 Drawing Sheet

(56) References Cited

U.S. PATENT DOCUMENTS

| | | | |
|---|---|---|---|
| 2007/0112475 A1* | 5/2007 | Koebler | B60L 3/12 |
| | | | 701/1 |
| 2008/0042817 A1* | 2/2008 | Fogelstrom | B60C 23/009 |
| | | | 340/442 |
| 2009/0289426 A1* | 11/2009 | Oscarsson | B60C 23/003 |
| | | | 280/5.503 |
| 2012/0221196 A1 | 8/2012 | Seymour et al. | |
| 2013/0046439 A1* | 2/2013 | Anderson | B60C 23/002 |
| | | | 701/36 |
| 2014/0015977 A1* | 1/2014 | Taylor | B60C 23/0408 |
| | | | 348/148 |
| 2014/0107889 A1 | 4/2014 | Pierfelice et al. | |
| 2015/0279128 A1* | 10/2015 | Izumi | G06F 17/30598 |
| | | | 701/29.1 |
| 2016/0231746 A1* | 8/2016 | Hazelton | G05D 1/0257 |
| 2016/0232565 A1* | 8/2016 | Goergen | G06Q 30/0255 |
| 2017/0334252 A1* | 11/2017 | Vervaet | B60C 23/002 |

FOREIGN PATENT DOCUMENTS

| | | |
|---|---|---|
| DE | 102011085041 A1 | 4/2013 |
| DE | 102013106548 A1 | 12/2014 |
| DE | 102015206239 A1 | 10/2015 |

OTHER PUBLICATIONS

European Search Report in foreign counterpart application No. 17158421.2 dated Jun. 28, 2017 (7 pages).
European Search Report issued in counterpart application No. 17158421.2 dated Nov. 20, 2018. (5 pages).

* cited by examiner

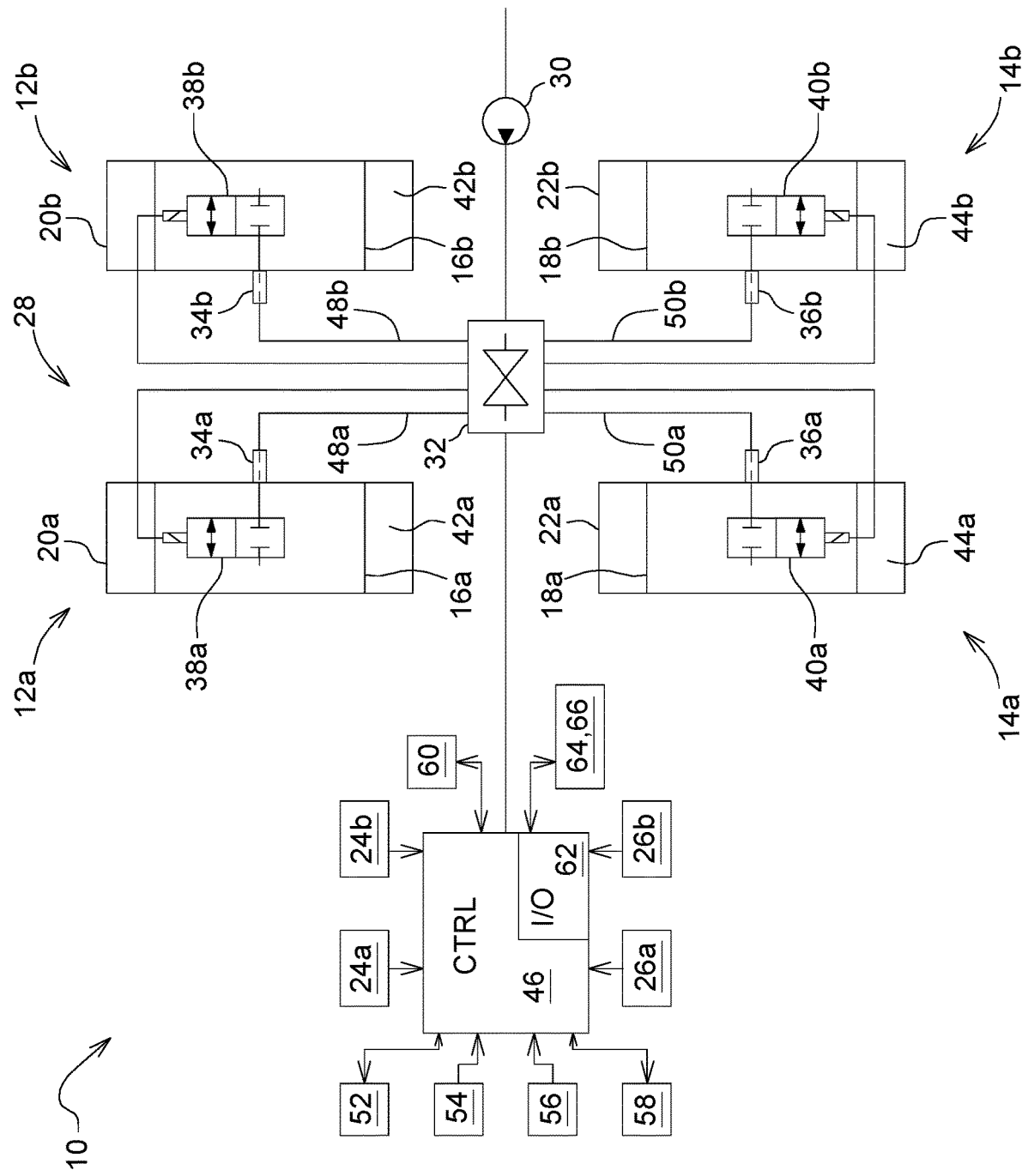

DEVICE FOR TIRE PRESSURE MONITORING OF A VEHICLE SYSTEM

RELATED APPLICATIONS

This application claims the benefit of German Application Ser. No. 102016203689.0, filed on Mar. 7, 2016, the disclosure of which is hereby expressly incorporated by reference in its entirety.

FIELD OF THE DISCLOSURE

The present disclosure relates to a device for monitoring the tire pressure of a vehicle system, and in particular, a vehicle system having at least one vehicle tire which communicates with a tire inflation system for adjusting an internal tire pressure, and a control unit which calculates a set value to be maintained for the internal tire pressure according to at least one external control parameter.

BACKGROUND

In this context, conventional systems include a central tire inflation system for an agricultural implement attached to an agricultural tractor, in which a tire pressure in an implement tire that is to be controlled with the central tire inflation system is applied as a function of the determined soil condition. The determination of the soil condition takes place, among other ways, on the basis of soil map data which is correlated with the current position of the agricultural implement. The current position of the agricultural implement is supplied, for example, by a GPS navigation system provided in the agricultural tractor.

In the case of large-volume vehicle tires, as are common in the agricultural field, the pressure control operations carried out by the tire inflation system to control the relevant tire pressure can require times in the range of minutes. The exact time is dependent in this case on the pressure control rate of the tire inflation system that is used, significantly on the filling capacity of an air compressor included in the inflation system. This circumstance becomes important in particular when leaving a field and in the subsequent switch to road travel, specifically when the field is traversed with reduced tire pressure in order to increase traction and the pressure must then be raised to a set value that is permissible for road travel before beginning said road travel. In this case, undesirable delays result from implementation of the tire inflation process during which an interruption-free continued travel is not easily possible.

It is therefore a task of this disclosure to further develop a device so that undesired delays that are produced by pressure control actions of the tire inflation system are avoided or at least markedly reduced.

SUMMARY

In one embodiment of the present disclosure, a device for tire pressure monitoring of a vehicle system includes at least one vehicle tire, which communicates with an inflation system for adjusting a tire pressure, and a control unit, which calculates a set value to be maintained for the tire pressure according to at least one external control parameter. According to the disclosure, the control unit adjusts the calculated set value in dependence on an operating state classification that derives from operating state parameters of the vehicle system, where the control unit determines a geoposition correlating with the derived operating state classification and stores it together with the operating state classification in a storage unit so that the relevant operating state classification can be called from the storage unit for purposes of anticipatory adjustment of the set value of the tire pressure when a renewed approach of the vehicle system to the stored geoposition is detected.

In this way it is possible to avoid or at least markedly reduce undesired delays due to pressure control actions of the tire inflation system by taking into account a corresponding advance control time. Thus, when leaving a field for subsequent road travel, the tire inflation process can already be initiated and completed before reaching the road so that interruption-free continued travel is ensured.

The required advance control time is dependent, among other things, on the specific pressure control rate of the tire inflation system that is used and on the amount the tire pressure is to be increased or decreased. By taking into account said parameters, the advance control time can be determined even more precisely.

The external control parameter is a load parameter, which characterizes the axle load on the pertinent axle groups of the vehicle system. The axle load is dependent on the one hand on the empty weight and the relevant center of gravity of the vehicle system (fixed portion of load) and on the other hand on a possible additional load and its distribution (variable portion of load). The higher the axle load is on a specific axle group, in general, the higher the set tire pressure that will be selected.

The control unit can derive the load on the basis of load-specific vehicle parameters. In the case of a vehicle system including an agricultural tractor and an agricultural implement, the load-specific vehicle parameters (in particular a specific axle load distribution), geometric properties of a power takeoff or hitching system provided for hitching the agricultural implement, or data on the weight and center of gravity of the agricultural implement can affect the load-specific vehicle parameters. The power takeoff is typically a hydraulically actuated three-point hitch, which is situated in the rear or front region of the agricultural tractor. Its geometric properties in this case result from the lever ratios of the power takeoff components such as the upper and lower link arms, the hydraulic lift cylinder, the lift arms, the lift spindles, and the like. The hitching system on the other hand can be designed as a drawbar or coupling jaw, in which a drawn implement can be attached.

The data on the weight and center of gravity of the agricultural implement can be selected from a configuration file stored in the storage unit either manually via a user interface or automatically when the agricultural implement is connected through noncontact reading of a wireless implement identifier, or for the case of an ISOBUS-capable agricultural implement, by calling up an ISOBUS identifier.

The weight and center of gravity of the agricultural implement can change over time according to the type of implement. This is the case, for example, with fertilizer spreaders, seeding machines, or sprayers, since in this case the load in a relevant reservoir decreases over time during operation. Accordingly, there is the possibility that the derivation of the load-specific vehicle parameters will take place, among other ways, by sensor detection of the forces or torques arising at the power takeoff. In addition or alternatively, a sensor measurement of the state of fill of the reservoir mounted on the agricultural implement can take place.

The external control parameter can further be characterized by the tire properties relative to the at least one vehicle tire. The tire properties can be dependent on the tire pressure, concern data regarding the tire geometry of the tire model that is used, a permissible load capacity, a minimal or maximal permissible tire pressure, or the rolling behavior. The relevant data are provided by the tire manufacturer and can be stored in the storage unit so that they can be called up either manually via the user interface by entering the relevant tire model or wirelessly by reading a radio-based tire identifier embedded in the tire.

The control unit derives the operating state classification from operating state parameters that are characteristic for the occurrence of operating states of the vehicle system with a tire pressure that is specific for them. For the above-mentioned case of a vehicle system including an agricultural tractor and an agricultural implement, the operating state parameters can reflect, among other things, the conditions of the traversed soil surface, a current vehicle speed, control valve settings or sequences that are characteristic for the conduct of specific hydraulic operating functions of the agricultural implement, or operating requirements of the driver or a driver assist system that indicates specific working procedures. Starting from said operating state parameters, a tire pressure matched to the properties of the traversed soil and the kind of operations being performed can be selected. Thus, a higher tire pressure is in general more desirable when traveling on a road than when traveling on a (soft) field surface, on which increased traction produced by increasing the tire contact area is desirable. The condition of the traversed soil surface can in this case be detected by a sensor, manually input by the driver via the user interface, or determined from map data by a comparison with the determined geoposition of the vehicle system. A sensor detection is possible, for example, by means of a near-infrared sensor system.

It is also possible that the control unit derives a recommended action for the manual actuation of the tire inflation system from the set value recommended for the tire pressure and outputs it via the user interface in a timely manner while observing the required advance control time.

Alternatively, the control unit can generate a command for driver-independent actuation of the tire inflation system from the set value calculated for the tire pressure. The control of the appropriate tire pressure in the at least one vehicle tire in this case takes place automatically according to the required advance control time.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE is a block diagram of an embodiment of a device for tire pressure monitoring of a vehicle system.

DETAILED DESCRIPTION

In a first embodiment of this disclosure, a block diagram is shown in the FIGURE of an embodiment of a device for a tire pressure monitoring of a vehicle system including an agricultural tractor and a hitched agricultural implement (not shown). The attachment of the agricultural implement in this case takes place at a power takeoff made as a hydraulically operated three-point hitch, which is situated in the rear or front of the agricultural tractor.

The device 10 includes left and right front wheels 12a, 12b, and left and right rear wheels 14a, 14b. Each of the front and rear wheels 12a, 12b, 14a, 14b has a wheel rim 16a, 16b, 18a, 18b, and a tire 20a, 20b, 22a, 22b mounted on the rim 16a, 16b, 18a, 18b. For each of the tires 20a, 20b, 22a, 22b there is an associated pressure sensor 24a, 24b, 26a, 26b for detection of a relevant tire pressure, which can be adjusted by means of a tire inflation system 28 that connects to the tires 20a, 20b, 22a, 22b, and is electrically controllable for this purpose.

The tire inflation system 28 enables a variation of the tire pressure that is individual to each wheel. For this, the tire inflation system 28 has a central control valve arrangement 32, which is supplied from an air compressor 30 and which is connected to the tires 20a, 20b, 22a, 22b via relevant rotary connections 34a, 34b, 36a, 36b, and connected wheel valves 38a, 38b, 40a, 40b, which allows a controlled adjustment of the tire pressure within a tire chamber 42a, 42b, 44a, 44b formed by the tires 20a, 20b, 22a, 22b.

Moreover, the device 10 comprises a microprocessor-controlled unit 46, which communicates with the pressure sensors 24a, 24b, 26a, 26b and the tire inflation system 28. Together with the pressure sensors 24a, 24b, 26a, 26b and the tire inflation system 28, the control unit 46 forms a control circuit for a set value to be maintained for the tire pressure.

The pressure sensors 24a, 24b, 26a, 26b can be embedded in a tire casing of the relevant vehicle tire 20a, 20b, 22a, 22b and can be connected to the control unit 46 via a wireless data link. In the present case, however, a wire-connected communication may be used in which the pressure sensors 24a, 24b, 26a, 26b are mounted firmly to the vehicle in order to detect the pressure conditions that prevail between the central control valve arrangement 32 and the rotary connections 34a, 34b, 36a, 36b in the relevant supply lines 48a, 48b, 50a, 50b. The wheel valves 38a, 38b, 40a, 40b are closed in an inactive state so that they can be briefly opened by the control unit 46 to measure the tire pressure, so that the tire pressure to be measured is present in the relevant supply line 48a, 48b, 50a, 50b. In a variation from this, it is also possible for a single (not shown) pressure sensor to be accommodated in the central control valve arrangement 32, where said sensor is provided with the tire pressure to be measured in sequence by successive opening of the wheel valves 38a, 38b, 40a, 40b.

In addition, the control unit 46 is connected to a user interface 52, which may be a touch-sensitive screen, a GPS navigation system 54 for determining a current geoposition of the vehicle system, a near-infrared sensor system 56 for sensor detection of the condition of the traversed soil surface, an RFID reader unit 58 disposed in the rear or front of the agricultural tractor, and a readable and writable storage unit 60. An interface 62 provided in the control unit 46 additionally enables data exchange with a CAN Bus 64 or an ISOBUS 66 of the vehicle system.

The operation of the device 10 is described with reference to the block diagram shown in the FIGURE. When the vehicle system is put into operation, the control unit 46 initially determines a first external control parameter. The first external control parameter is a load parameter, which characterizes the axle load arising at the relevant axle groups 68 and 70 of the vehicle system. In the case of a wheel-less agricultural implement, the load parameter refers exclusively to the two axle groups of the agricultural tractor with their relevant front and rear wheels 12a, 12b, 14a, 14b.

The axle load is dependent on the one hand on the empty weight and the relevant center of gravity of the vehicle system and on the other hand on a possible additional load and its distribution.

The control unit 46 derives the load parameter on the basis of load-specific vehicle parameters. For example, the load-specific vehicle parameters relate to an axle load distribution that is specific for the relevant tractor model, geometric properties of the power takeoff that is intended for attaching the agricultural implement, or data on the weight and center of gravity of the agricultural implement.

The data on the weight and center of gravity of the agricultural implement are selected from a configuration data file stored in the storage unit 60 either manually via the user interface 52, or automatically when connecting the agricultural implement through wireless reading of an RFID-based implement identifier by means of the RFID reader 58, and transmitted to the control unit 46. Optionally, in the case of an ISOBUS-capable agricultural implement, an automatic selection takes place by calling up an ISOBUS identifier via the interface 62 provided in the control unit 46.

The weight and center of gravity of the agricultural implement can change over time in each case according to the type of implement. This is the case, for example, with fertilizer spreaders, seeding machines, or sprayers. Here, the additional load in a relevant reservoir decreases over time during operation. The derivation of the load-specific vehicle parameters takes place through sensor detection of the forces or torques arising at the power takeoff while taking into account the lever ratios of the power takeoff components, which are provided as known quantities. In addition or alternatively, a sensor measurement of the state of fill is carried out on the reservoir mounted on the agricultural implement, where the relevant state of fill is available in the form of the appropriate data at the ISOBUS 66 of the vehicle system and is transmitted to the control unit 46 via the interface 62.

At the same time, the control unit 46 determines a second external control parameter. The second external control parameter is characterized by the tire properties related to the vehicle wheels 20a, 20b, 22a, 22b. Depending on the tire pressure, tire properties concern data on the tire geometry of the tire model that is used, a permissible load capacity, a minimal or maximal permissible tire pressure, or the rolling or traction behavior. The data needed for this are made available by the tire manufacturer and are stored in the storage unit 60, so that the data can be called up either manually via the user interface 52 by entering the relevant tire model or by wireless reading of an RFID-based tire identifier embedded in the tire casing by means of the RFID reader unit 58 and transmitted to the control unit 46.

The control unit 46 determines a set value to be maintained for the tire pressure on the basis of the determined first and second external control parameters. In order to calculate the tire geometry, which may differ for the front and rear wheels in the case of agricultural tractors, the calculation is individually adjusted for each of the axle groups.

The calculated set value is additionally adjusted by the control unit 46 in dependence on an operating state classification derived from the operating state parameters of the vehicle system.

The control unit 46 conducts the operating state classification on the basis of operating state parameters that are characteristic for the occurrence of operating states of the vehicle system with a tire pressure that is specific for it. For the present case of a vehicle system consisting of an agricultural tractor and an agricultural implement, the operating state parameters give the condition of the traversed soil surface, a current speed of the vehicle system, characteristic control valve settings or sequences for conducting specific hydraulic working functions of the agricultural implement, or operating requirements of the driver or a driver assist system that indicate specific operating procedures. Based on the operating state parameters, which are available as the corresponding data from the CAN data bus 64, the control unit 46 selects a set value for the tire pressure that is matched to the properties of the traversed ground and the type of operations being performed.

The condition of the traversed soil surface is sensed by means of the near-infrared sensor system 56, manually input via the user interface 52, or determined from cartographic data by comparison with a geoposition of the vehicle system determined by the GPS navigation system 54.

Finally, the control unit 46 derives a recommended action for the manual actuation of the tire inflation system 28 from the set value calculated for the tire pressure and outputs the recommendation in the form of a corresponding text instruction via the user interface 52. Alternatively, the control unit 46 generates a control command for driver-independent actuation of the tire inflation system 28. The control of the corresponding tire pressure into the at least one vehicle tire takes place in this case automatically according to the required advance control time.

At the same time, the control unit 46 determines a geoposition of the vehicle system that correlates with the operating state classification being carried out and stores it together with the operating state classification in the storage unit 60. The geoposition is made available by the GPS navigation system 54. If the control unit 46 detects a renewed approach to the stored geoposition during the operation of the vehicle system, it calls up the relevant operating state classification for purposes of anticipatory adjustment of the set value of the tire pressure from the storage unit 60. The output of the recommended action or generation of the control command that is based on this for purposes of controlling the tire pressure corresponding to said value then takes place while allowing for a corresponding advance control time which is measured so that undesired delays caused by pressure control actions of the tire inflation system are avoided or at least markedly reduced.

The required advance control time is dependent, among other things, on the specific inflation or deflation rate of the tire inflation system 28 and on the amount the tire pressure is to be increased or decreased. By taking said parameters into account, the advance control time is determined more precisely.

Finally, it should be noted that instead of an RFID-based implement or tire identifier, it is also possible to provide any other wireless identification means, which is based, for example, on the use of Bluetooth transponders.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for tire pressure monitoring of a vehicle system including at least one vehicle tire, comprising:

a tire inflation system in communication with the at least one vehicle tire, the tire inflation system configured to adjust a tire pressure of the at least one vehicle tire;

at least one pressure sensor measuring the tire pressure of the at least one vehicle tire;

a control unit configured to calculate a set pressure value to be maintained for the tire pressure, the at least one pressure sensor in communication with the control unit, and the set pressure value based on at least one external control parameter; and a storage unit in communication with the control unit;

wherein the control unit controllably adjusts the calculated set pressure value in dependence on an operating state classification derived from operating state parameters of the vehicle system such that the control unit determines a geoposition of the vehicle system correlating with the derived operating state classification and stores it with the operating state classification in the storage unit;

wherein the operating state parameters include a plurality of control valve settings indicating specific hydraulic working functions of an agricultural implement and a plurality of operating requirements of a driver assist system indicating specific operating procedures;

wherein the control unit operably retrieves from the storage unit the relevant operating state classification for purposes of anticipatory adjustment of the set pressure value of the tire pressure when a renewed approach of the vehicle system to the stored geoposition is detected;

wherein the control unit is configured to determine an amount of time for the anticipatory adjustment of the tire pressure to the set pressure value before the at least one vehicle tire reaches the stored geoposition; and wherein the control unit is configured to perform at least one of the following: (1) derive a recommended action for the manual actuation of the tire inflation system from the set pressure value calculated for the tire pressure and output said action via a user interface, and (2) generate a control command for a driver-independent actuation of the tire inflation system from the set pressure value calculated for the tire pressure.

2. The device of claim 1, wherein the at least one external control parameter comprises a load parameter characterized by an axle load arising at a relevant axle group of the vehicle system.

3. The device of claim 2, wherein the control unit operably derives the load parameter on the basis of load-specific vehicle parameters.

4. The device of claim 1, wherein the at least one external control parameter comprises a tire property of the at least one vehicle tire.

5. The device of claim 1, wherein the control unit operably derives the operating state classification from operating state parameters that are characteristic for the occurrence of operating states of the vehicle system with a tire pressure that is specific therefor.

6. The device of claim 1, wherein the control unit operably derives a recommended action for the manual actuation of the tire inflation system from the set pressure value calculated for the tire pressure and outputs said action via a user interface in time to adjust the tire pressure to the set pressure value before the at least one tire vehicle reaches the stored geoposition.

7. The device of claim 1, wherein the control unit operably generates a control command for a driver-independent actuation of the tire inflation system from the set pressure value calculated for the tire pressure adjusting the tire pressure to the set pressure value before the at least one tire vehicle reaches the stored geoposition.

8. A vehicle system, comprising:
a tractor;
an implement coupled to the tractor;
at least one vehicle tire having a tire pressure;
at least one pressure sensor measuring the tire pressure of the at least one vehicle tire; and
a device comprising:
   a tire inflation system in communication with the at least one vehicle tire, the tire inflation system configured to adjust a tire pressure of the at least one vehicle tire;
   a control unit configured to calculate a set pressure value to be maintained for the tire pressure, the control unit in communication with the at least one pressure sensor, and the set pressure value based on at least one external control parameter; and
   a storage unit in communication with the control unit;
   wherein the control unit controllably adjusts the calculated set pressure value in dependence on an operating state classification derived from operating state parameters of the vehicle system such that the control unit determines a geoposition of the vehicle system correlating with the derived operating state classification and stores it with the operating state classification in the storage unit;
   wherein the operating state parameters include a plurality of control valve settings indicating specific hydraulic working functions of an agricultural implement and a plurality of operating requirements of a driver assist system indicating specific operating procedures;
   wherein the control unit operably retrieves from the storage unit the relevant operating state classification for purposes of anticipatory adjustment of the set pressure value of the tire pressure when a renewed approach of the vehicle system to the stored geoposition is detected;
   wherein the control unit is configured to determine an amount of time for the anticipatory adjustment of the tire pressure to the set pressure value before the at least one vehicle tire reaches the stored geoposition; and
   wherein the control unit is configured to perform at least one of the following: (1) derive a recommended action for the manual actuation of the tire inflation system from the set pressure value calculated for the tire pressure and output said action via a user interface, and (2) generate a control command for a driver-independent actuation of the tire inflation system from the set pressure value calculated for the tire pressure.

9. The vehicle system of claim 8, wherein the at least one external control parameter comprises a load parameter characterized by an axle load arising at a relevant axle group of the vehicle system.

10. The vehicle system of claim 9, wherein the control unit operably derives the load parameter on the basis of load-specific vehicle parameters.

11. The vehicle system of claim 8, wherein the at least one external control parameter comprises a tire property of the at least one vehicle tire.

12. The vehicle system of claim 8, wherein the control unit operably derives the operating state classification from operating state parameters that are characteristic for the occurrence of operating states of the vehicle system with a tire pressure that is specific therefor.

13. The vehicle system of claim 8, wherein the control unit operably derives a recommended action for the manual actuation of the tire inflation system from the set pressure value calculated for the tire pressure and outputs said action via a user interface in time to adjust the tire pressure to the set pressure value before the at least one tire vehicle reaches the stored geoposition.

14. The vehicle system of claim 8, wherein the control unit operably generates a control command for a driver-independent actuation of the tire inflation system from the set pressure value calculated for the tire pressure adjusting the tire pressure to the set pressure value before the at least one tire vehicle reaches the stored geoposition.

* * * * *